United States Patent [19]
Panis

[11] 3,975,987
[45] Aug. 24, 1976

[54] DEVICE TO CONTROL A LIFTING CYLINDER

[75] Inventor: Martinus Johannes Josephus Maria Panis, Tilburg, Netherlands

[73] Assignee: Van Doorne's Bedrijfswagenfabriek DAF B.V., Eindhoven, Netherlands

[22] Filed: June 7, 1974

[21] Appl. No.: 477,499

[30] Foreign Application Priority Data
July 3, 1973 Netherlands.................... 7309231

[52] U.S. Cl............................ 91/420; 60/476
[51] Int. Cl.²................ F15B 11/08; F15B 13/042
[58] Field of Search..................... 91/420; 251/122; 60/476

[56] References Cited
UNITED STATES PATENTS

| | | | |
|---|---|---|---|
| 1,720,389 | 7/1929 | Binks | 251/122 |
| 1,929,973 | 10/1933 | Haley | 251/122 X |
| 2,588,520 | 3/1952 | Halgren et al. | 91/420 |
| 2,799,994 | 7/1957 | Leathers et al. | 91/420 X |
| 2,830,561 | 4/1958 | Lindstrom | 91/420 X |
| 2,991,759 | 7/1961 | Pilch | 91/420 X |
| 3,015,316 | 1/1962 | Thomas | 91/420 |
| 3,213,874 | 10/1965 | Schmiel et al. | 251/122 X |
| 3,272,086 | 9/1966 | Soeters | 91/420 |
| 3,795,178 | 3/1974 | Roche | 91/420 |

*Primary Examiner*—Irwin C. Cohen
*Attorney, Agent, or Firm*—Wenderoth, Lind & Ponack

[57] ABSTRACT

A device for controlling the quantity of hydraulic fluid returned to a pump from a double-acting lifting cylinder for lifting and lowering a load which moves through a dead point includes a housing, a control piston slidable within the housing and defining two spaces within the housing, each of the spaces being adapted to be connected to a pump. Two further spaces are provided within the housing and adapted to be connected, one to each side of the double-acting lifting cylinder. Each further space is connected with one of the spaces by way of a valve, and each of the valves is operable by means of the control piston. During use, the quantity of hydraulic fluid allowed to return from the lifting cylinder, through one of the further spaces and its associated valve and space, and returned to the pump, is proportional to the displacement of the control piston which depends on the pressure exerted by the pump.

4 Claims, 2 Drawing Figures

DEVICE TO CONTROL A LIFTING CYLINDER

BACKGROUND OF THE INVENTION

The present invention relates to a device for controlling the quantity of hydraulic fluid, e.g. oil, returned to a pump from a double-acting lifting cylinder employed for lifting and lowering a load (e.g. a truck-tilt cab) which moves through a dead point.

When tilting a cab, hydraulic pressure is exerted against a piston of a lifting cylinder by a pump, which is usually a manually operated pump. The hydraulic pressure is required until the centre of gravity of the cab has been lifted so far, that it is in a vertical position above the pivotal centre of the cab. If the cab is tilted further, hydraulic fluid under pressure is still supplied by the pump, but the cabin starts to release its potential energy. This energy should be absorbed by the flow resistance of the hydraulic fluid.

In tilt cabs of the above described type, it is required that they be able to remain in any position, i.e. that the tilting movement may only take place if the pump is actually operated. Moreover, it is then required that in any position, in which the cab is located, leakage of hydraulic fluid is excluded. This means that the valve or valves in the hydraulic control mechanism have to lock completely.

Another demand which is made on a control device for such a cylinder is that when the pump is operated during that part of the stroke in which the cab is being lifted, the flow of hydraulic fluid should take place with as little resistance as possible in order to keep the force required for tilting as small as possible.

In known constructions, in order to satisfy the demand that the locking of the flow of hydraulic fluid at a certain moment takes place in a completely leakage-free manner, a completely locking valve (for instance a ball valve) is used as a locking member. Such a valve construction, however, is usually not controllable, i.e. the flow is either completely blocked or completely or almost completely opened.

When the energy of the pump and of the cab, after passing the dead point during tilting, have to be taken up by flow resistance in the hydraulic control system, a valve which has only an opened or closed position has serious disadvantages. The cab will first make a free fall by which the valve abruptly closes while the movement of the cab is thus suddenly braked, thereby causing a violent jolting. This will soon lead to rupture of the suspension points.

SUMMARY OF THE INVENTION

In order to avoid the above disadvantages it is ensured by the present invention that in any condition of tilting of the cab, its rate of movement is determined by the rate of supply of hydraulic fluid, and this is made possible by not having the rate of flow of fluid from the lifting cylinder any larger, in any case, than the flow rate of fluid from the pump.

According to the present invention there is provided a device for controlling the quantity of hydraulic fluid returned to a pump from a double-acting lifting cylinder for lifting and lowering a load which moves through a dead point. The device includes a housing, a control piston slidable within the housing and defining two primary spaces with the housing, each of the spaces being adapted to be connected to a pump. Two further spaces are provided within the housing and are adapted to be connected to opposite sides of the double-acting lifting cylinder. Each further space is connected with one of the primary spaces by way of a valve, each of the valves being operable by means of the control piston. During use, the quantity of hydraulic fluid allowed to return from the lifting cylinder, through one of the further spaces and its associated valve and primary space, and returned to the pump, is proportional to the displacement of the control piston which depends on the pressure exerted by the pump.

In the present invention reaction forces on the control piston are effected by a spring or another element, the compression of which is proportional to the force applied thereto, while all remaining forces, i.e. the forces effected on the piston by the valves, are kept relatively small by the small sizes of the valves. By this arrangement the stroke of the control piston will be proportional to the pump pressure.

In one embodiment of the present invention, each valve is a ball valve and can be opened against suitable biasing means by movement of a pin engageable by the control piston.

Each pin has a decreased cross-section over a part of the length thereof, and moreover, for the remaining part of the length, it has a gradually decreasing cross-section.

The effect of these features is that the rate of return of fluid continuously increases with an increasing displacement of each pin, which displacement is equal to that of the control piston (except for the free stroke thereof), which in turn is proportional to the pump pressure.

The rate of return of fluid consequently continuously increases with the pump pressure. As the flow resistance is very low at the supply side, the supplied fluid flow, which will naturally also increase continuously with the pump pressure, will never be smaller than the return fluid flow.

BRIEF DESCRIPTION OF THE DRAWINGS

The invention will now described by way of example with reference to the accompanying drawings in which.

DETAILED DESCRIPTION OF THE INVENTION

Figure 1:
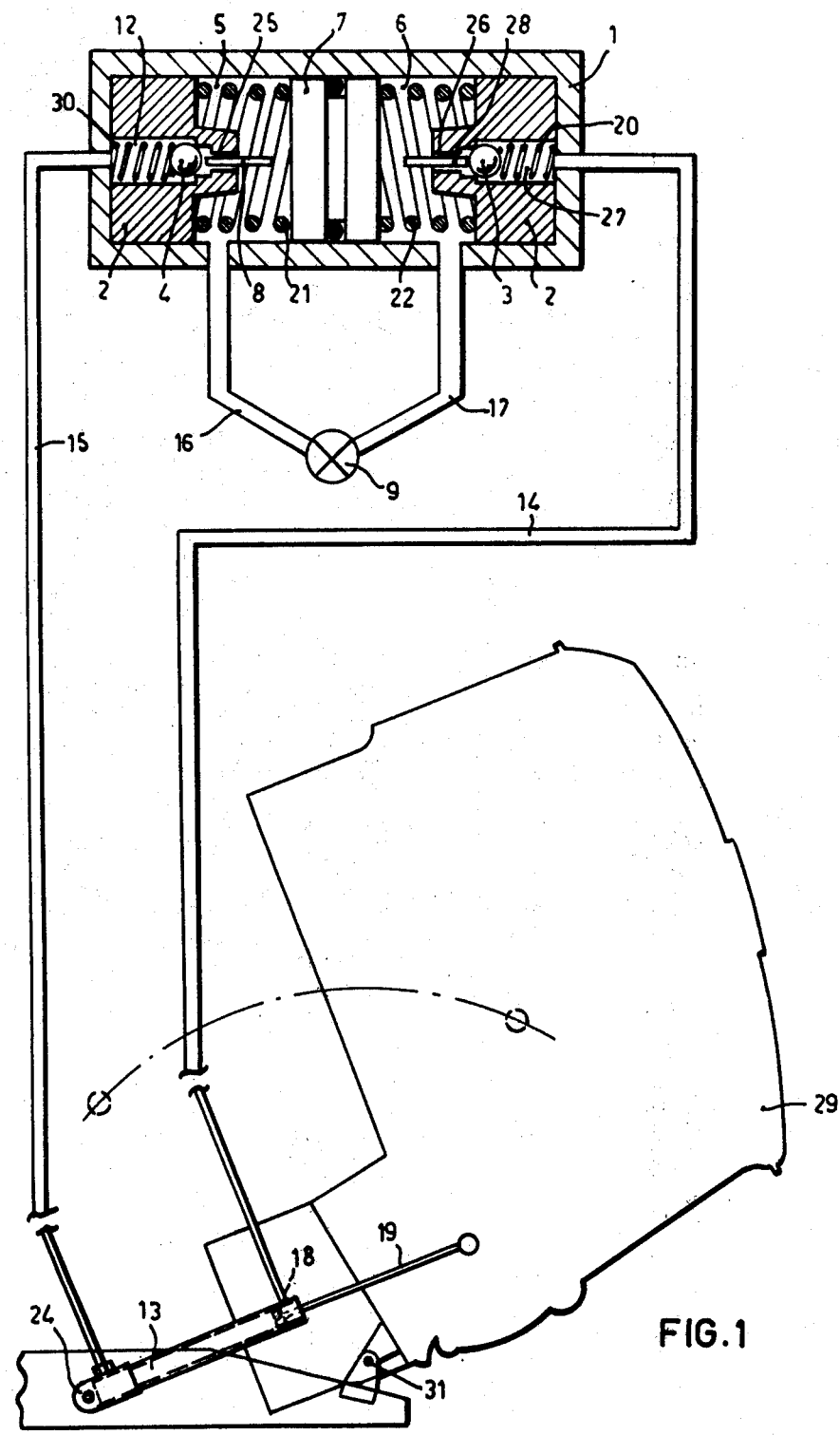
FIG. 1 is a schematic representation of a tiltable cab which is provided with a lifting cylinder of known type having a control device according to one embodiment of the present invention.
Figure 2:
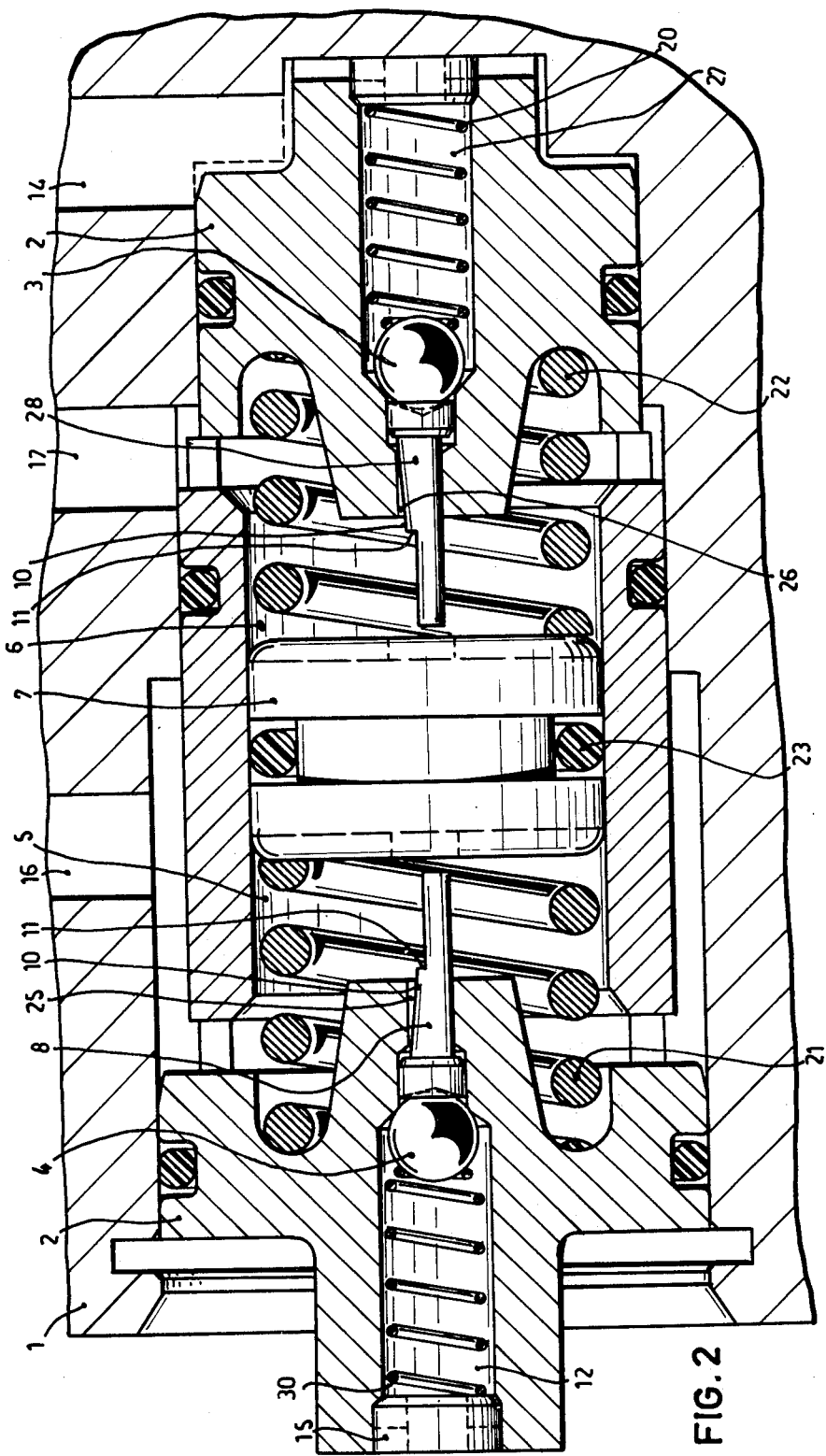
FIG. 2 is a cross-sectional view of the control device of FIG. 1.

Referring to the drawings, a double-acting lifting cylinder 24, for lifting and lowering a cab 29, includes a cylinder 13 containing a piston 18 and piston rod 19. The cylinder 24 is connected to a control device by means of conduits 14 and 15. Alternatively however a housing 1 of the control device may be formed integral with the lifting cylinder 24. In the housing 1 there is provided a displaceable control piston 7 which divides the interior of the housing into primary spaces or chambers 5 and 6. The piston is sealed with respect to the wall of the housing 1 by a sealing ring 23. At both sides of the control piston 7 there are relatively heavy helical springs 21 and 22. Two auxiliary or further spaces or chambers 12 and 27 are provided in the body 2 of the control device. The space 5 is connected with the space 12 via a channel 25, and the space 6 is connected with the space 27 via a channel 26 (see FIG. 2).

Balls 4 and 3 are arranged in the spaces 12 and 27 respectively and are urged by respective helical springs 30 and 20 into positions to seal off the channels 25 and 26 respectively.

Pins 8 and 28 are arranged in the channels 25 and 26 respectively and these pins may press the balls from their seats in the case of displacement of the control piston 7. Each of the pins is gradually decreased in cross-section by a bevel 10 and is further decreased in cross-section by a step 11.

A pump 9 is connected with the spaces 5 and 6 via respective conduits 16 and 17, and these spaces 5 and 6 are connected with the lifting cylinder 24 via the channels 25 and 26 and the conduits 15 and 14 respectively.

The process for tilting the cab 29 is as follows.

By means of a tap at the pump 9, the conduit 17 is connected to the pressure side of the pump and the conduit 16 is connected to the feedback side of the pump. When the pump is operating, oil under pressure is exerted through the conduit 17 into the space 6. The pressure moves the pin 28 to the right and the ball 3 is pushed from its seat. The oil pressure is exerted through the channel 26, the space 27 and the conduit 14 to the right of the operating piston 18. At the same time the control piston 7 is moved to the left against the action of the spring 21. This movement of piston 7 causes the pin 8 to push the ball 4 from its seat. Because of the overpressure on the right of the piston 18, the piston is moved to the left, thus causing the cab to be tilted.

The oil at the left of the operating piston 18 can flow back to the pump 9 via the conduit 15, the space 12, the valve 4 (which is opened to an extent dependent upon the pump pressure), the channel 25 and the conduit 16.

This condition remains until the centre of gravity of the cab is above the centre of rotation 31. After this point, the cab, as well as the pump pressure, effect a force to the left on the operating piston 18. The pump pressure which is required at this stage for tilting the cab is in fact zero. The pump pressure is only required to compensate the clearance between the control piston 7 and the control pin 8. A certain pump pressure is needed to move the control piston 7 to the left, against the pressure of spring 21, so that via the control pin 8 the ball 4 is released from its seat and consequently oil may flow back to the pump 9 via channel 15, the space 12, channel 25, the space 5 and the channel 16.

When the pump 9 is operating quickly a high pressure will occur at the right of the operating piston 18 and the position of the control piston 7 will accordingly be adjusted, such that the oil at the left side of the operating piston 18 will be able to flow back quickly.

When the pump 9 is operating slowly the control device will also accordingly be adjusted, such that the control pin 8 is only displaced slightly to the left and consequently only a slow return flow of oil may occur.

When the pump 9 is stopped the control piston 7 will return in its centre position and will enable the ball 4 to return to the seat under influence of the spring 21 and the oil flow around the ball.

When pumping is restarted pressure is exerted again in the space 6 thus causing the control piston 7 to push the pin 8 to the left. The reaction force of the spring 21 on the control piston 7 ensures that the pin 8 is pushed to the left to such an extent that the opening in the channel 25 is proportionate to the pump pressure.

The cab may be tilted in the reverse direction to that described above, by connecting the pressure side of pump 9 to the conduit 16.

In summary, it can be said that the invention relates to a double-acting hydraulic cylinder for lifting and lowering a load, the load moving through a dead point, so that the weight of the lifted load itself effects operation on the lifting cylinder and for which the lifting and lowering is only allowed to take place when the pump is operated, so that the load to be lifted or lowered may be stopped in any position.

In order to prevent undesirable jolting occurring during lowering of the load, the control mechanism according to the invention maintains the quantity of fed-back oil proportional to the pump pressure.

This is possible because the double-acting control piston present in the control mechanism is substantially dependent on the pump pressure. This is achieved by having an element, (e.g. a spring) the displacement of which is proportional to the force applied, effecting reaction forces on the control piston, and by keeping other forces on the control piston, such as those which the valves effect on the control piston, relatively small.

The flow of the oil is controlled by a pin in a channel, the pin having such a shape that for lifting the load, a large passage opening is available, while for lowering the load, the position of the pin leaves a small opening in order to throttle the oil pressure. The helical springs are relatively rigid while the locking balls are relatively small.

What is claimed is:

1. In a system for pivotally lifting and lowering a load along a path such that the load moves through a point at which the center of gravity of the load is above the axis of pivotal movement thereof; said system being of the type including a double-acting lifting cylinder connectable to a load, a fluid pump, first and second fluid conduits leading from said pump to first and second chambers of said lifting cylinder for selectively pumping fluid under pressure through one of said fluid conduits into one of said chambers to selectively move said load and for returning fluid from the other of said chambers through the other of said fluid conduits to said pump, and a control device communicating with said first and second fluid conduits for controlling the quantity of fluid returned to said pump; the improvement wherein said control device comprises:

a housing;

a control piston slidably positioned within said housing and defining therewithin a pair of primary chambers;

means for connecting each of said primary chambers to said pump;

means defining a pair of auxiliary chambers within said housing, one each of said auxiliary chambers being connected to one of said first and second fluid conduits;

a pair of restricted orifices respectively connecting one of said primary chambers with a corresponding one of said auxiliary chambers;

a pair of valve means, one each in one of said auxiliary chambers, and means for biasing said valve means to normally close said restricted orifices when said pump is not operated;

a pair of valve actuator means, separate from said valve means and said control piston, one each mounted within one of said restricted orifices, alternately contactable by said control piston upon movement thereof, for opening a respective of said valve means;

whereby, when said pump supplies fluid under pressure into a first of said primary chambers, said fluid opens a corresponding first said valve means and passes through the corresponding first auxiliary chamber into a corresponding first chamber of said lifting cylinder, and said fluid simultaneously moves said control piston toward a second of said primary chambers, thus contacting the respective second valve actuator means and opening the respective second valve means, thereby allowing fluid from the second chamber of said lifting cylinder to pass through the second auxiliary chamber, said second restricted orifice and said second primary chamber and be returned to said pump;

a pair of compression means, one each positioned in one of said primary chambers, for restricting movement of said control piston proportional to the pressure of fluid supplied by said pump to said first primary chamber; and each said valve actuator means having a first end portion of uniformly enlarged diameter slidably mounted in said housing adjacent said orifice and abutting said valve means, a second end portion, adjacent said control piston, of a uniformly reduced diameter, and an intermediate portion having a tapering cross-section of a tapered diameter increasing toward said valve means and positioned within said restricted orifice, thus forming means for controlling the amount of returned fluid proportional to the amount of movement of said control piston.

2. The improvement claimed in claim 1, wherein each said compression means comprises a compression spring.

3. The improvement claimed in claim 1, wherein each said valve means comprises a ball valve.

4. The improvement claimed in claim 3, wherein each said valve actuator means comprises a pin.

* * * * *